7439X
J. L. HINKLE.
STEAM GENERATOR AND REFINER.
Patented Feb. 23, 1833.
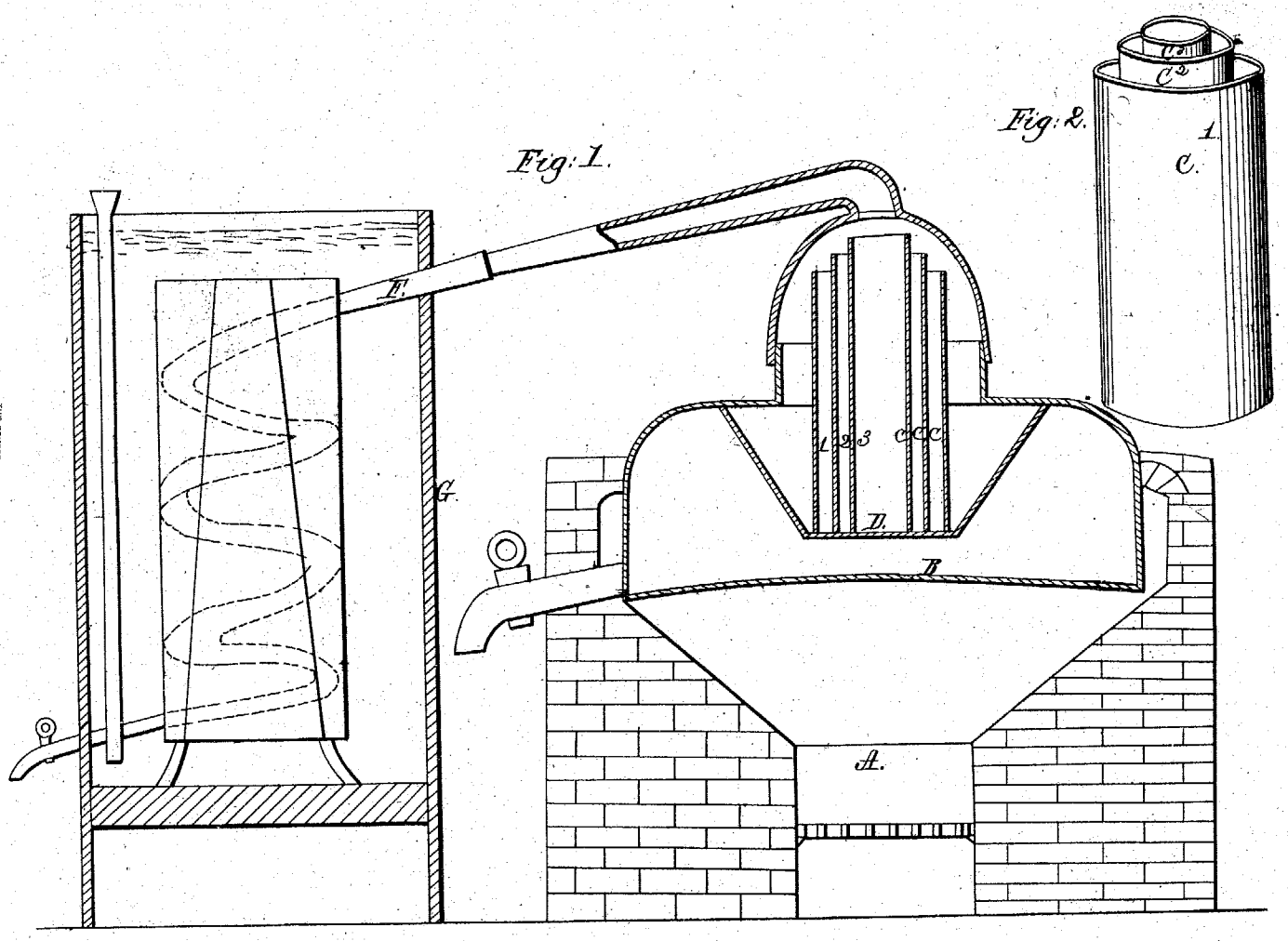
THE ECKERT LITHOGRAPHING CO., WASHINGTON, D. C.

2 Sheets—Sheet 2.
7439X
J. L. HINKLE.
STEAM GENERATOR AND REFINER.
Patented Feb. 23, 1833.
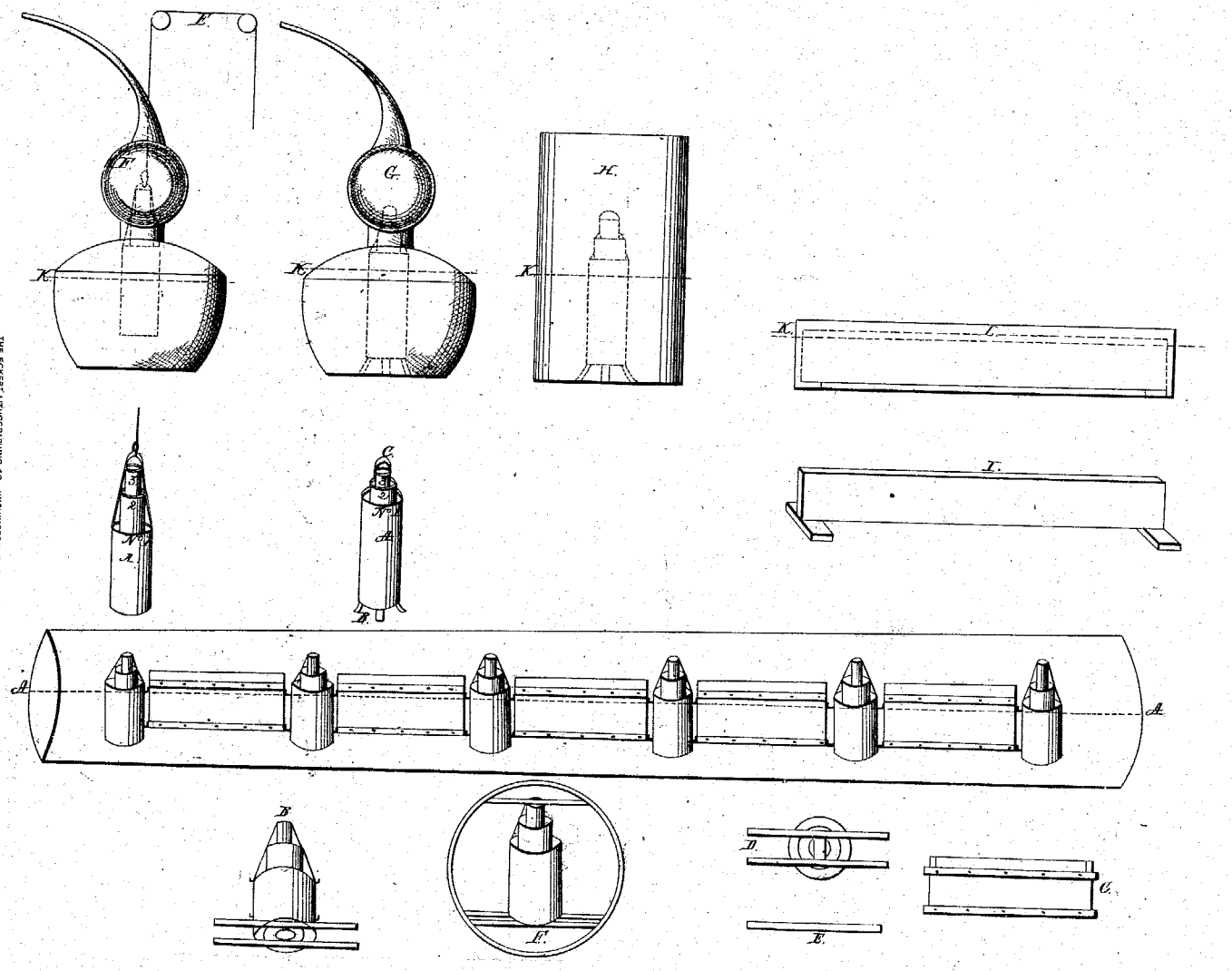
THE ECKERT LITHOGRAPHING CO., WASHINGTON, D. C.

v. 11 7439X
Feb 23, 1833 263.

John L. Hinkle. Hanover Pa.

Letters Patent.

The Schedule referred to in these Letters Patent and making part of the same, containing a description in the words of the said John L. Hinkle himself, of his improvement called the Steam Generator & Refiner.

To all to whom these presents shall come.

Be it known that I. John L. Hinkle of the Borough of Hanover in the County of York and State of Pennsylvania have invented a new and useful improvement in Generating and refining Steam, called the Steam Generator and Refiner, and that the following is a full and exact description of the construction and also the shape and size the same may be made and constructed to suit all purposes whatsoever, where generating and refining steam is the object, and also the operation of the same, as invented or improved by me. The great advantages derived from the use of the newly invented Steam Generator & Refiner, consists principally, in the power to increase and refine the steam — In kettles for distilling spirituous liquors, it will reduce the firey flavor, refine and mellow the liquor as if it had age, save fewel, and produce more spirits from the same mass; and in less time than by the present mode of proceeding. In a Still kettle measuring twenty eight inches from the top of the neck to the bottom, and fourteen inches wide at the neck, place the Steam Generator & refiner in the center of the doubling still. The Steam Generator and refiner may be made in the following manner viz:

Three cylinder tubes are placed within each other, made of sheet copper brass, tin, iron, lead, pewter, ~~or~~ wood Drawing

7439X wood &c. in sheets or bars.

Tube No. 1, say the outer, may be ten inches wide and twenty one inches high, open at both ends, resting on four strong feet, one inch high, & rivetted thereto; and at the same end where the feet are, a strong cross bar of one inch broad may also be rivetted to the in. cylinder for the other two open tubes to rest upon. Tube say No. 2, seven inches wide and twenty three inches high and Tube No. 3, four inches wide, and twenty five inches high; the height of each tube may be varied from two to fifteen and more inches; the tubes should be rivetted to the cross bar of No. 1, at equal distances from the circumference of each, and also braced at the top of each, to keep it regular with a handle. This Steam Generator and Refiner may be put in the doubling still, because on the old system, when the fluid begins to boil and circulate, it rises on the outer part of it, and throws it into the center, which is lower than the outer part & buries the steam, but when the Steam-Generator and Refiner is placed in the center of the still, it will rise, throw it upwards and produce a rapid generation of steam. It will also impede the violent action of circulation, occasioned by too much heat from the furnace, which destroys the spirit in the still, and produces bad liquor. This Steam Generator and refiner refines it, produces more, and can be taken out and set or hung in the still, at every running off, or may remain in it, but the size of the Steam Generator & refiner should be regulated nearly to the size of the still and its height. In singling stills where, wheat, rye, corn, malt, molasses, sugar, honey, &c. being the component parts is distilled, it is necessary to stir the mass before and at the time it begins to boil, as the heavy parts frequently settle to the bottom, and if not stirred will burn fast injure the still and and make bad liquor. In order to avoid this difficulty, the Steam Generator & Refiner may be made on the same plan with a slight variation, about ten inches shorter from below, without feet, and the cross bars turned upwards, hung at the handle in the center of the still on a cross bar, resting on braces in the neck of the still, so as to give ten inches space between the Steam Generator and refiner and the bottom, which will leave room for stirring the mass, or there may be a strong copper or other wire attached to the top of the handle of Steam-Generators and refiners, and run the same through a small hole, made through the top of the cap of the still, and fixed to a pulley, by which it may be raised into the cap, clear from the mass or beer in the still, to give sufficient room for stirring.

When the fluid begins to run from the worm, then lower the steam-generator and refiner into the mass or beer, so that the inner tube from the top will be from five to nine inches in the cap; this must be regulated by the pulley at the time it is put in, which will save the trouble of removing the cap from the singling still at every running off, and a little past around the wire at the place it passes the cap, will prevent the steam from passing out.

The steam-generator and refiner may also be made with one, two or any number of tubes or bars, of any of the above or other materials, either triangular, square or octagonal, or any other shape or size, be it hollow or solid, and if placed in the center of the still, it will have nearly the same effect; the worm of the stills should be two inches wide, with five or six turns, in a large tub holding a good body of water, in order to cool and condense the steam.

The steam-generator and refiner may be made in any shape or size to lie, stand or hang, when placed in the center Center or near it, in any other kettle, steam boiler of
any shape or size whatsoever, so that the top or part of
it extends from three to four inches and upwards above
the point or height of boiling, it will produce a rapid gene-
-ration of steam, refine and keep it regular, and will
also have a tendency to prevent the bursting of kettles,
or any other description of boilers used for the produc-
tion of steam, as the high degree of heat from the
furnace is not required when the steam Generator
and Refiner is used.

All which I claim as my invention and
improvement.

Witnesses — John L. Hinkle

Ex.d W. P. Elliot.

Ch.f.W. Adam King — 1271 wds